United States Patent

[11] 3,633,426

[72] Inventor Arthur B. Broerman
 Bartlesville, Okla.
[21] Appl. No. 62,551
[22] Filed Aug. 10, 1970
[45] Patented Jan. 11, 1972
[73] Assignee Phillips Petroleum Company

[54] CHROMATOGRAPHIC ANALYZER SAMPLE VALVE
 6 Claims, 5 Drawing Figs.
[52] U.S. Cl................................................. 73/422 GC, 55/197
[51] Int. Cl..................................................... G01n 1/00
[50] Field of Search........................................ 73/422 GC; 251/62

[56] References Cited
UNITED STATES PATENTS
2,955,618 10/1960 Miller............................ 251/62
3,198,018 8/1965 Broerman..................... 73/422 GC Primary Examiner—S. Clement Swisher
Attorney—Young and Quigg ABSTRACT: A sample valve for a chromatographic analyzer is actuated by a pair of pistons which move plungers to block communication between selected valve ports. The valve components are contained within a cylindrical housing by split rings and spring washers. The force exerted by the washers on one end of the valve assembly is concentrated by a cylindrical plate having a central protrusion.

INVENTOR.
A. B. BROERMAN
BY Young & Quigg
ATTORNEYS

INVENTOR.
A. B. BROERMAN

INVENTOR.
A. B. BROERMAN

CHROMATOGRAPHIC ANALYZER SAMPLE VALVE

It is common practice to analyze fluid mixtures by means of chromatography. In a conventional chromatographic analyzer, a sample of the material to be analyzed is introduced into a chromatographic column, and carrier gas is thereafter passed through the column to elute the constituents of the sample in sequence. It is important that the sample volumes remain constant in order to obtain reproducable results for a series of analyses. This can be accomplished by means of sample valves which trap a predetermined volume of the sample in a loop and deliver this trapped volume to the column when the valve is actuated. A number of pneumatically operated diaphragm valves have been designed which are particularly effective for this purpose.

One such valve is described in my copending application, Ser. No. 796,718, filed Feb. 5, 1969 now U.S. Pat. No. 3,545,491. The components of the valve described therein are contained within a cylindrical housing. Split rings are positioned in grooves within the housing to retain the valve components in predetermined positions. Spring washers are employed to bear against the split rings and exert forces on the valve components. Movable pistons are contained within the housing to displace plungers which selectively block passages between spaced ports of the valve. These plungers are arranged in a circular path with alternate plungers being moved together in response to the valve being actuated. The resulting assembly is analogous to a three-legged stool which can be somewhat unstable under certain conditions.

In accordance with the present invention, a valve of the foregoing type is improved by inserting a circular plate between the springs and one of the pistons which actuates the plungers. The plate is provided with a center protrusion which concentrates the force of the springs at essentially a single point. This provides a more stable valve assembly and permits the valve to handle fluids at higher pressures.

Figure 5:
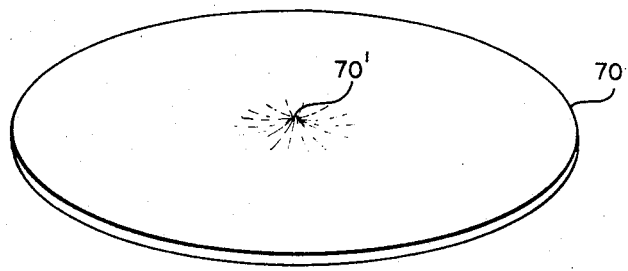

FIG. 5 is a perspective view of the force concentrating plate employed in the valve of this invention. Referring now to the drawing in detail and to FIG. 1 in particular, there is shown a chromatographic column 10 which contains any suitable packing or partitioning material. Carrier fluid is introduced through a conduit 11 which communicates with a first inlet port 11a of the sample valve 12. This carrier fluid can either be a gas or a liquid, depending on the particular packing material and the desired separation. A sample fluid to be analyzed is introduced through a conduit 13 which communicates with an inlet port 13a of valve 12. A conduit 14 extends from a valve port 14a to the inlet of column 10. A conduit 15 extends from the outlet of column 10 to the first inlet of a detector 16. A portion of the carrier fluid is directed through a conduit 17 to a second inlet of detector 16. As is well known in the art, detector 16 can be any suitable instrument which is capable of providing an output signal that is representative of differences in composition of the two fluids passed thereto.

Sample valve 12 is employed to introduce a predetermined volume of sample selectively to the inlet of column 10. This is accomplished by means of a sample loop 20 which extends between ports 20a and 20a'. The volume of sample loop 20 is selected in accordance with the desired volume of sample to be introduced into the valve. When the valve is in the position illustrated, the ports are connected in the directions shown by the solid lines. Carrier fluid thus flows from conduit 11 to conduit 14. Sample material flows from conduit 13 through sample loop 20 and is vented through a conduit 21 which communicates with a port 21a. When the sample valve is actuated, the ports are connected in the directions shown by the illustrated broken lines. At this time, carrier fluid displaces the volume of sample trapped in sample loop 20 and forces this sample into column 10. The incoming sample is passed to vent conduit 21 at this time. Sample valve 12 is pneumatically operated and receives operating pressure from a pilot valve 22. Power gas is introduced into valve 22 through an inlet conduit 23. A conduit 24 extends between the pilot valve and sample valve 12. A conduit 25 extends from valve 22 to a vacuum pump 26 to facilitate operation of the sample valve under certain conditions, as described hereafter in greater detail. The operation of the sample valve can be controlled by a programmer 27 which actuates pilot valve 22 at predetermined intervals. Operation of the sample valve by pilot valve 22 is described in greater detail in U.S. Pat. No. 3,376,894.

Figure 1:
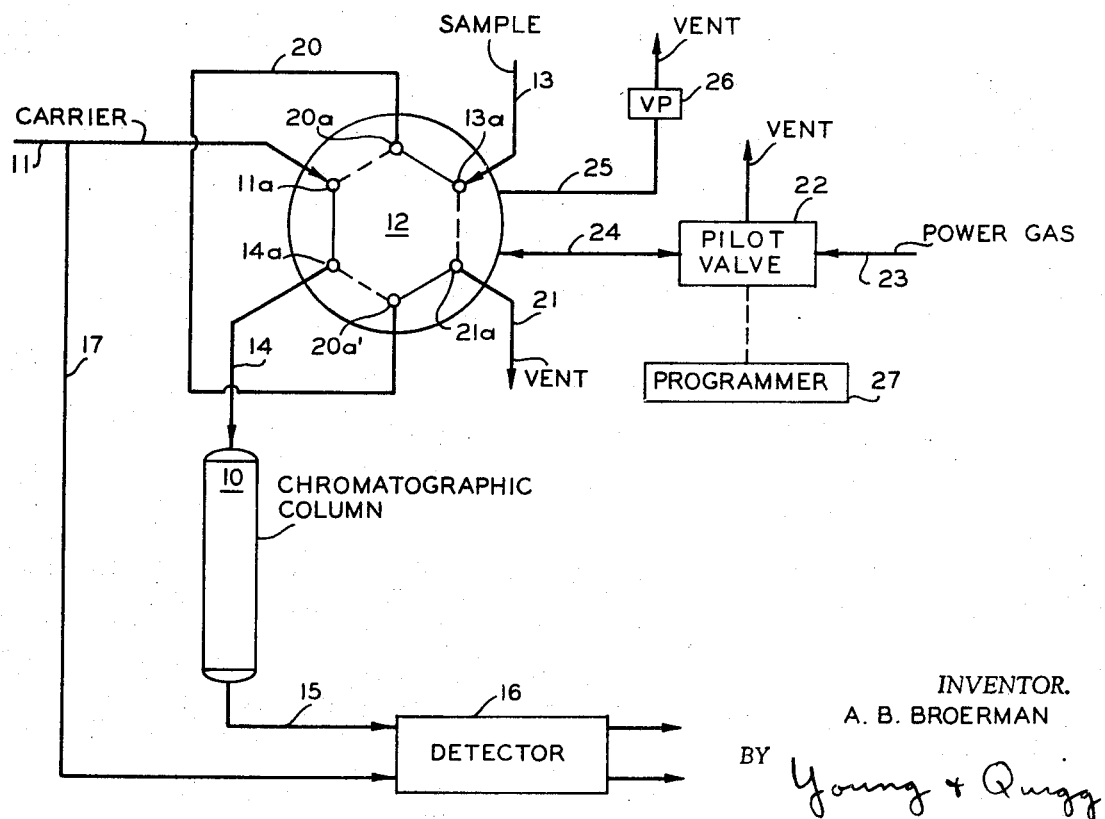
FIG. 1 is a schematic representation of a chromatographic analyzer having the sample valve of this invention incorporated therein.
Figure 2:
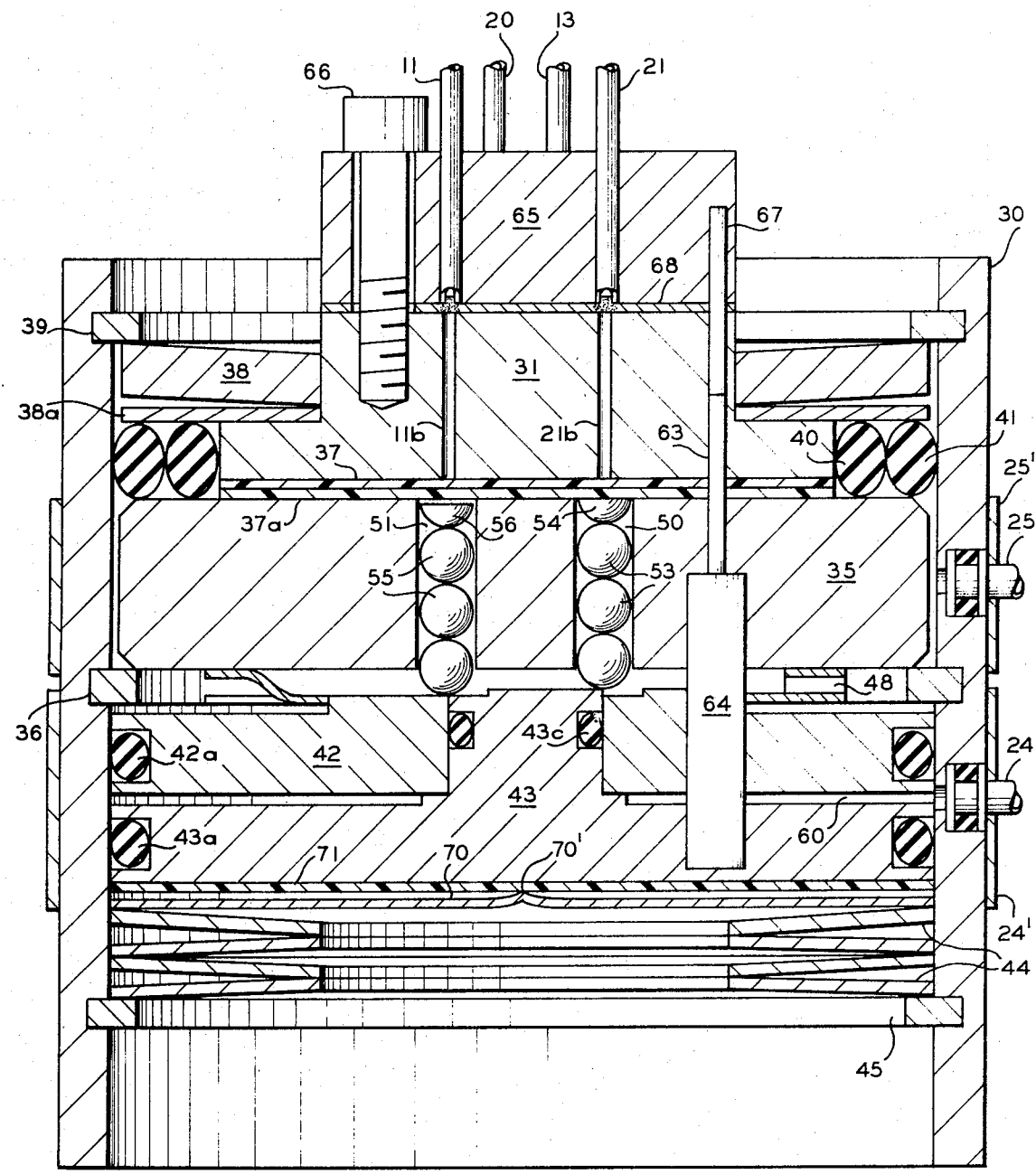
FIG. 2 is a view, shown partially in section, of the sample valve employed in the analyzer of FIG. 1.
Figure 3:
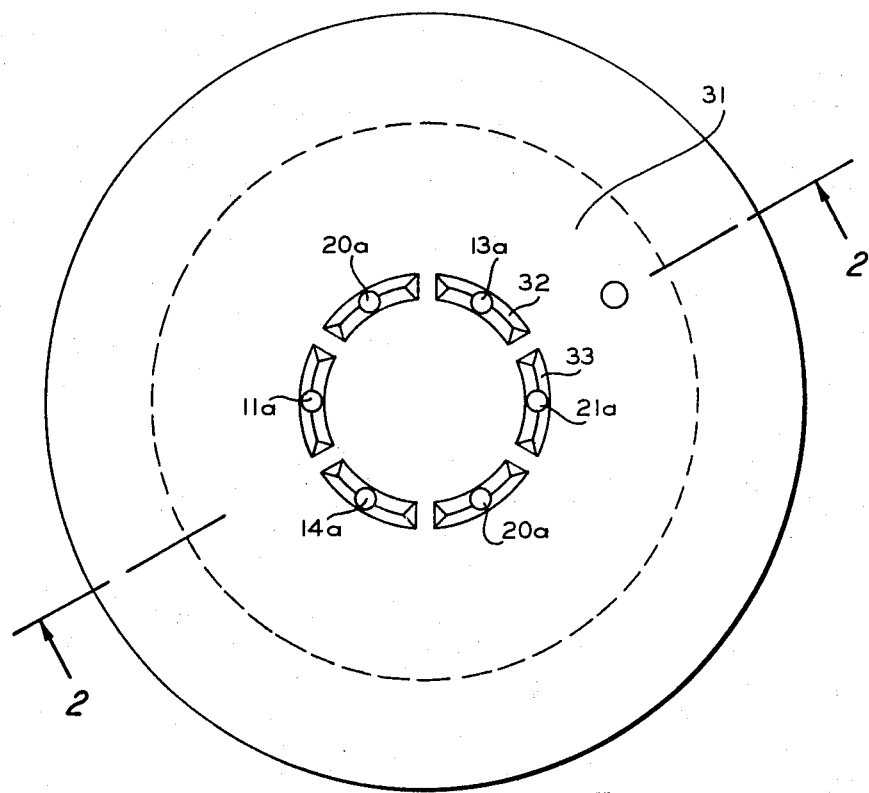
FIG. 3 illustrates the lower face of the cap of the valve of FIG. 2.
Figure 4:
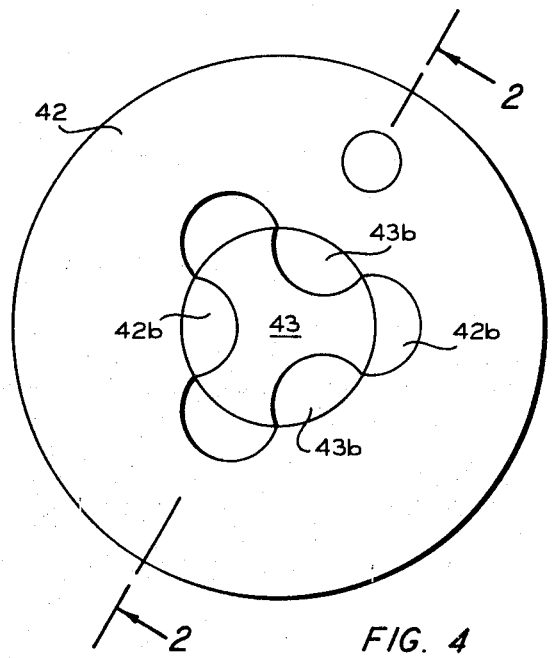
FIG. 4 is a top view of the movable piston in the valve of FIG. 2.

Sample valve 12 is illustrated in FIGS. 2, 3 and 4. The valve components are contained within a cylindrical housing 30. These components include a valve cap 31 which is connected to conduits 11, 20, 13, 21 and 14 of FIG. 1. These conduits communicate with respective passages, two of which are shown as passages 11b and 21b, that extend from the upper surface of cap 31 to spaced points on the lower surface which lie in a circular path. The lower ends of these passages constitute the ports illustrated in FIG. 3. As shown therein, the lower surface of valve body 31 is provided with a plurality of recesses which extend part of the distance between adjacent ports. For example, a recess 32 extends from port 13a toward port 21a, and a recess 33 extends from port 21a toward port 13a. Corresponding recesses are provided adjacent each of the ports in the lower surfaces of valve cap 31.

A cylindrical valve body 35 is positioned within housing 30 and supported on a split-retaining ring 36 which is snapped into a central recess in the housing. Two diaphragms 37 and 37a are disposed between cap 31 and body 35. The upper diaphragm can advantageously be formed of polymerized tetrafluoroethylene, and the lower diaphragm 37a can advantageously be formed of polyester. However, a single diaphragm can be employed if desired. A spring, such as a Belleville washer 38, surrounds the upper portion of cap 31 and engages a second split-retaining ring 39 which is inserted in an upper recess in housing 30. A washer 38a is positioned between washer 38 and cap 31. Annular sealing rings 40 and 41 are disposed in the region between body 35, cap 31 and washer 38a.

Two movable pistons 42 and 43 are positioned within housing 30 beneath body 35. These pistons are supported by a stack of Belleville washers 44 which rests on a third split-retaining ring 45. A cylindrical plate 70, which has a central protrusion 70', is positioned between the top washer 44 and a dust-sealing disk 72 which engages the lower surface of piston 43. Disk 71 can be formed of a plastic material such as polymerized tetrafluoroethylene. Plate 70 is illustrated in FIG. 4. As will be explained hereafter in greater detail, the purpose of plate 70 is to concentrate the force of the washers at the central region of piston 43. A spring 48 is positioned between body 35 and upper piston 42 to exert a downward force on this piston. Piston 42 carries a sealing ring 42a, and piston 43 carries sealing rings 43a and 43c.

Body 35 is provided with six vertical passages, two of which are shown as passages 50 and 51. The upper ends of these passages lie in the circle defined by the six ports in the lower face of cap 31, with the upper end of each passage being located between a pair of adjacent ports in the cap. For example, the upper end of passage 50 lies between ports 21a and 13a. Movable plungers are disposed in each of the six passages in body 35. As illustrated, the plunger in passage 50 comprises three stacked spheres 53 having a half-sphere 54 at the top of the stack. Similar elements are disposed in the other five passages which extend through body member 35. Spheres 55 and a half-sphere 56 are shown in passage 51. If desired, these spherical elements can be replaced by cylindrical rods.

Pistons 42 and 43 are designed to control movement of the plungers through the passages of body 35. As illustrated in FIGS. 2 and 3, the elevated upper surface of piston 43 engages the stack of spheres in passage 50 so as to move half-sphere 54 into engagement with the lower surface of diaphragm 37a. This serves to compress diaphragms 37 and 37a between ports 13a and 21a so as to block communication between these ports. The lowermost sphere 55 in passage 51 rests on a cutout portion of piston 43 and on piston 42 so that half-sphere 56 in passage 51 is depressed from diaphragm 37a when the valve is in the position illustrated. The plungers in the remaining passages in body 35 are connected in a corresponding manner with alternate plungers engaged diaphragm 37a when the valve is in the position illustrated.

Conduit 24 of FIG. 1 communicates with a chamber 60 between pistons 42 and 43. Conduit 25 communicates with a region above piston 42. Conduits 24 and 25 are advantageously secured to housing 30 by respective spring-retaining rings 24' and 25' which partially surround the housing and are provided with slots to engage the ends of the conduits. Pins 63 and 64 are provided to maintain alignment between elements 31, 35, 42 and 43 when the valve is assembled.

In the absence of power gas flowing into chamber 60 of FIG. 2, the valve is in the position illustrated. Washers 44 and plate 50 exert an upward force on piston 43, the upper surface of which engages lowermost sphere 53 so that the region of diaphragms 37 and 37a engaged by half-sphere 54 is moved upwardly to block communication between ports 13a and 21a. Communication is also blocked between ports 11a, 20a and 14a, 21a by corresponding plunger means, not shown. This serves to connect the ports in the directions illustrated by the solid lines in FIG. 1. The pressures of the flowing fluids serve to depress diaphragms 37 and 37a into those recesses illustrated in FIG. 3 which are not blocked by the elevated plungers.

When pilot valve 22 is switched to the second position, power gas is introduced into chamber 60 from conduit 24. As the pressure builds up in chamber 60, a force is exerted to move piston 42 upwardly against the force of retaining spring 48. This results in the upper surface of piston 42 engaging lowermost spheres 55 to raise spheres 55 and 56 through passages 51. As the pressure continues to increase in chamber 60, sufficient force is built up to overcome the force of washers 44 so that piston 43 is moved downwardly. This lowers spheres 53 and 54. The combined movement of the two groups of spheres thus switches the valves to the position illustrated by the dotted lines in FIG. 1.

In a second embodiment of the valve operation, vacuum pump 26 of FIG. 1 is connected by conduit 25 to the region above piston 42. This permits operation with carrier gas and/or sample fluid of substantially lower pressures because the application of vacuum to the underside of diaphragm 37a through passages 50 and 51 assist in the downward displacement of the diaphragm. In this embodiment it is often desirable to connect the pilot valve vent conduit to the inlet of vacuum pump 26. This removes residual atmospheric pressure from chamber 60 when an air signal is not being applied. Otherwise, there is a danger of this residual pressure overcoming spring 48.

It is often advantageous to connect the inlet conduits to the valve of this invention by means of a manifold 65, as shown in FIG. 2. Manifold 65 is provided with a plurality of spaced passages to receive the inlet conduits. These passages terminate adjacent the corresponding passages in cap 31. Manifold 65 can be attached to cap 31 by a plurality of screws 66. Correct alignment between members 31 and 65 is assured by means of a pin 67. A sealing gasket 68 is disposed between members 65 and 31. In a preferred embodiment, this gasket is formed of a compressible porous material such as sintered silver. When screws 66 are tightened, the porous material is compressed to form a seal. However, the six spaced regions at the ends of the inlet conduits are not so compressed, with the result that the original porous material forms a filter to remove any particulate material that might be present in the carrier gas or sample material.

As previously mentioned, an important feature of this invention resides in the use of circular plate 70 which is provided with central protrusion 70'. This serves to concentrate the force of Belleville washers 44 at the center of piston 43. The concentration of force at this region prevents any rocking motion which might otherwise occur due to the fact that the upper portion of the piston engages three spaced plungers. It has been found that this construction permits operation of the valve with samples at substantially higher pressures than could be employed heretofore.

While this invention has been described in conjunction with a presently preferred embodiment, it should be evident that it is not limited thereto.

What is claimed is:

1. In a sample valve which includes a housing enclosing a body having six longitudinal passages therethrough which terminate in a generally circular first path at a first face of the body, a cap having six longitudinal passages therethrough which terminate in a generally circular second path at a first face of the cap, said first and second paths having substantially the same diameter, a diaphragm positioned adjacent the first face of said body, means urging said cap against said diaphragm so that the first face of said cap is adjacent the first face of said body member and said first and second circular paths are adjacent one another with the longitudinal passages in said cap terminating between the longitudinal passages in said body member, a first annular piston positioned adjacent said body on the side thereof remote from said cap, a second piston positioned adjacent said first piston, said second piston having a central section which extends through said first piston, said first and second pistons being of such configuration that a chamber is formed therebetween, said housing having an opening therein which communicates with said chamber, spring means positioned to exert a force on said second piston urging said second piston toward said first piston, and plungers positioned in each of the passages in said body member, the lengths of said plungers and the configurations of said pistons being such that first alternate plungers engage said diaphragm in the absence of external fluid pressure being applied to said chamber and second alternate plunger means engage said diaphragm when external fluid pressure is applied to said chamber; the improvement comprising a plate having a central protrusion thereon, said plate being positioned between said spring means and said second piston so that said protrusion engages said second piston and concentrates the force of said spring means at a central region of said second piston relative to said first circular path.

2. The sample valve of claim 1 further comprising a disk positioned between said second piston and said plate and engaging the walls of said housing to form a seal therewith.

3. The sample valve of claim 1 wherein said spring means comprises a plurality of Belleville washers.

4. The sample valve of claim 1 further comprising a manifold secured to said cap, said manifold having six passages therethrough which terminate in communication with respective passages through said cap.

5. The sample valve of claim 4, further comprising a gasket formed of compressible, normally porous material positioned between said cap and said manifold so that the gasket is compressed to become nonporous when the manifold is secured to the body, with regions of said gasket adjacent said passages remaining noncompressed and porous.

6. The sample valve of claim 5 wherein said gasket is formed of sintered silver.

* * * * *